Sept. 18, 1956
A. LATOUR
2,763,754
SECTIONALIZING SYSTEM WITH PRESSURE FLUID
OPERATED CIRCUIT BREAKERS FOR HIGH
VOLTAGE TRANSMISSION LINES
Filed April 22, 1955
3 Sheets-Sheet 1
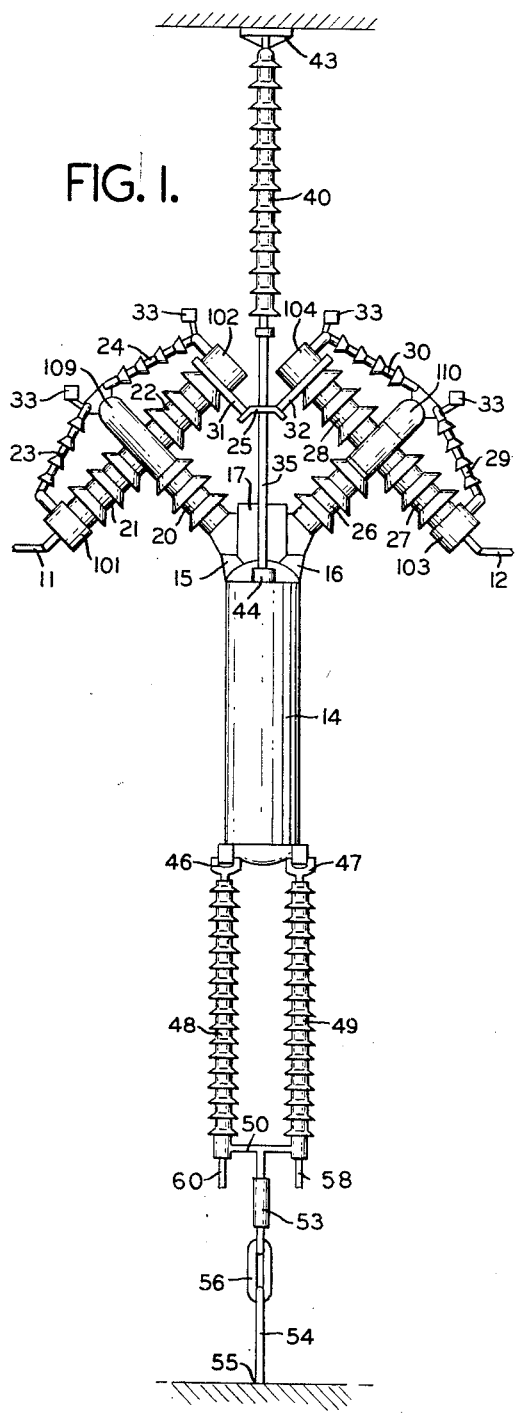
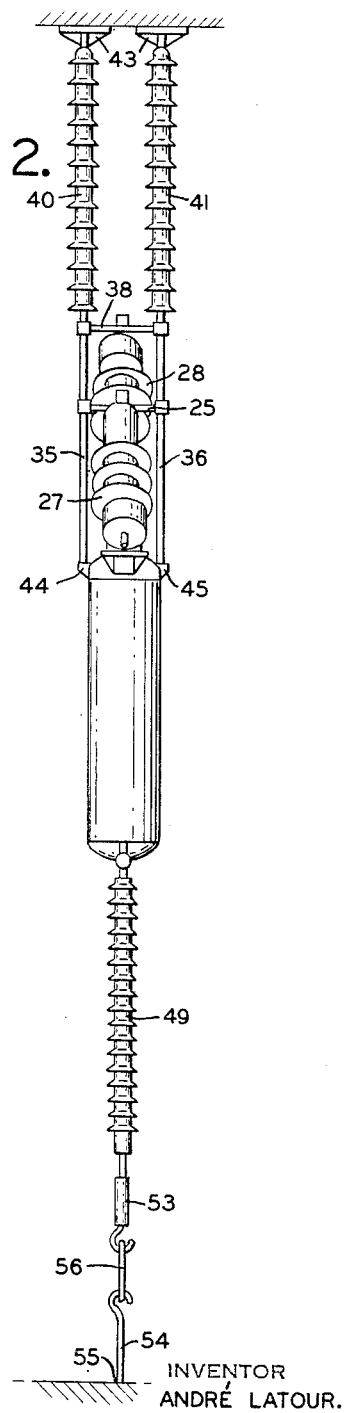
INVENTOR
ANDRÉ LATOUR.
BY Heinrich Hohnschild
ATTORNEY Sept. 18, 1956  A. LATOUR  2,763,754
SECTIONALIZING SYSTEM WITH PRESSURE FLUID
OPERATED CIRCUIT BREAKERS FOR HIGH
VOLTAGE TRANSMISSION LINES
Filed April 22, 1955  3 Sheets-Sheet 2
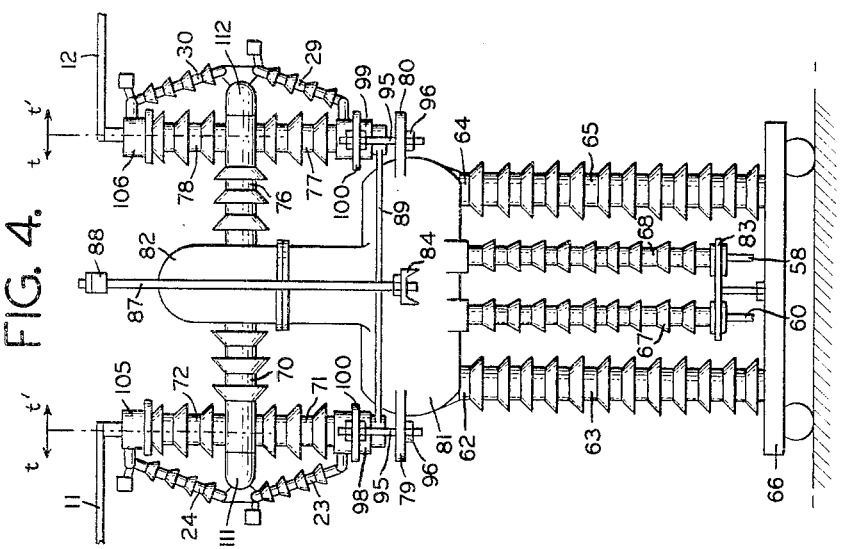
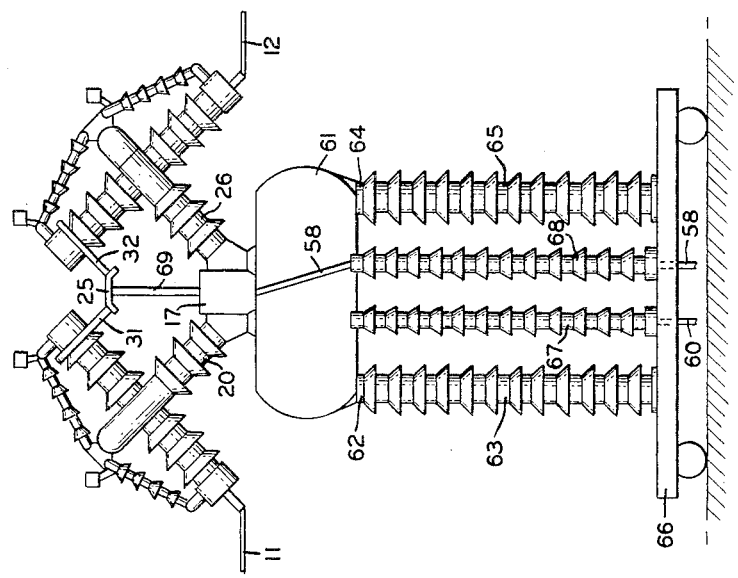
INVENTOR
ANDRÉ LATOUR.
BY
ATTORNEY Sept. 18, 1956  A. LATOUR  2,763,754
SECTIONALIZING SYSTEM WITH PRESSURE FLUID
OPERATED CIRCUIT BREAKERS FOR HIGH
VOLTAGE TRANSMISSION LINES
Filed April 22, 1955  3 Sheets-Sheet 3

INVENTOR
ANDRÉ LATOUR.
BY Heinrich Hochschild
ATTORNEY

United States Patent Office 2,763,754
Patented Sept. 18, 1956

2,763,754

SECTIONALIZING SYSTEM WITH PRESSURE FLUID OPERATED CIRCUIT BREAKERS FOR HIGH VOLTAGE TRANSMISSION LINES

André Latour, Grenoble, France, assignor to Etablissements Merlin & Gerin, Grenoble, France Application April 22, 1955, Serial No. 503,197

Claims priority, application France April 30, 1954

13 Claims. (Cl. 200—168)

The invention refers to pressure fluid operated or pneumatic circuit breakers which are connected in series into high voltage power lines and are for the purpose of separating the line sections from one another.

Particularly, the invention refers to circuit breakers of the type in which the circuit breaking device comprises several or a plurality of circuit breaking chambers symmetrically disposed with relation to a vertical plane and supported by means of a reservoir for the compressed air or other operating fluid by means of which the circuit breaker is operated.

In circuit breaking devices of this type, a principal object of the invention is an arrangement for supporting the circuit breaker or the circuit breaker units which makes possible to reduce the strains to which the porcelain insulators are subjected which support the circuit breaking chambers, and particularly makes it possible to avoid or reduce bending stresses to which these supporting insulators might otherwise be subjected.

With these objects in view, the circuit breaking chambers are supported at the reservoir so that the geometric axes of the insulating supports which hold the chambers at the reservoir form an angle of notable magnitude with the vertical, such as an angle of 45° or 90°, as the examples illustrated show.

The circuit breaking chambers are so disposed that their longitudinal axes are extended perpendicularly of the geometric axes of the insulators which hold them together and together with them lie in a common vertical plane.

Additional supporting means are provided at the reservoir for supporting the chambers thereon for thus transmitting the longitudinal components of the forces of gravity from the weight of the chambers and thus fully or substantially relieve the holding insulators from gravity moments thereon.

The insulating supports are hollow and form ducts which connect the space of the reservoir with the spaces of the circuit breaking chambers.

In the preferred embodiment of the invention, the circuit breaking chambers are combined in pairs to form each a circuit breaker unit with the chambers of each unit arranged symmetrically about, and with their common longitudinal axis perpendicular to a median geometric symmetry axis which at the same time is the geometric axis of the insulating support. The number of the units depends upon or corresponds to the number of line sections arriving at and departing from the tower for each phase of the network.

The chamber, or one of the chambers of each circuit breaker unit bears with its outer, free end upon the reservoir, and in further development of the invention bears upon the reservoir through the intermediary of elastic means, so that the longitudinal component of the force of gravity from the circuit breaker unit is transmitted elastically upon the reservoir.

Another object of the invention is the reduction of the length of the insulators which carry the chamber groups or circuit breaker units.

In order to achieve this object of the invention, a pair of circuit breaker units is connected between the incoming line and the outgoing line of each phase and the reservoir is set under tension preferably by connecting it electrically with the conductor which provides for the passage of the current of one chamber group or circuit breaker unit to the other. Each circuit breaker unit thus comprises a pair of circuit breaking chambers, and is supported at the reservoir by means of a holding insulator between the chambers. The circuit breakers are connected at one of their terminals to the lines, one to the incoming line, the other to the outgoing line, and further are connected at their other terminals together in series. At these terminals, where they are connected together, the circuit breaker units bear upon the reservoir and are electrically connected therewith. Under these conditions, the holding insulators which at the same time supply the operating pressure fluid to the circuit breaking or arc chamber, are subjected electrically to half the service tension. They may thus be shorter than otherwise when the reservoir is to be insulated from the circuit breaker; their weight will be greatly reduced, and the path along which the operating fluid is to travel is greatly shortened.

A further object of the invention is to make it possible that the same circuit breaker-reservoir system may be employed, be it suspended from a line tower or be it placed on the ground.

With this object in view, the reservoir for the pressure medium is provided, on the one hand, with attachments at which one or more suspending insulators or insulator chains or strings may be attached, and, on the other hand, with brackets which make it possible to place the reservoir, with the circuit breaker units thereupon, upon supporting insulators or insulator stacks secured to a carriage or other chassis and placed on the ground or a platflorm or other base structure of the ground.

In any of these cases, the circuit breaking chambers will be supplied with and controlled by a pressure fluid admitted through insulating conduits leading from the compression station and the command post to the circuit breaking chambers.

These and other objects and features of the invention will become apparent as the now ensuing specific description of my invention proceeds in which the invention will be described with reference to the accompanying drawings which form part of this specification and which by way of example illustrate various embodiments of my invention.

These drawings, however, as will be readily understood, are intended to be explicative of the invention but not limitative of its scope. Other embodiments incorporating the principles underlying my invention are feasible without departing from the spirit and ambit of my appended claims.

In the drawings:

Fig. 1 is a front view of a sectionalizing system with two circuit breaker units, each unit with a pair of circuit breaking chambers, where the axes of the insulators which hold the circuit breaker units at the reservoir form an angle of 45° with the vertical;

Fig. 2 is a side view of the system of Fig. 1;

Fig. 3 is a front view of a modified system arranged for being placed upon the ground;

Fig. 4 is a front view of a sectionalizing system placed upon the ground and in which the axes of the holding insulators form an angle of 90° with the vertical;

Figure 5:
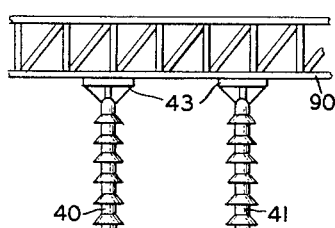
Fig. 5 is a side view of the same circuit breaker-reservoir system as in Fig. 4 but suspended between an overhead carrying structure of a line tower and the ground.

In the drawings, the incoming line is designated by 11, the outgoing line by 12. Connected in series between the lines is the sectionalizing circuit breaker system comprising in the embodiments of Figs. 1 and 2, and of Fig. 3 two circuit breaker units each comprising two circuit breaking chambers 21, 22 and 27, 28, respectively, so that the current is broken at four points, at each point with a pair of contacts. The chambers of each unit are joined in pairs so that their axes are in alignment.

The circuit breakers are of the pressure fluid operated type such as I have described in my U. S. Patent No. 2,584,888 and have illustrated for instance in Fig. 1 thereof. Since however the inner structure of these circuit breakers forms no part of this invention, this structure is neither illustrated nor described here in detail.

Each circuit breaker unit is supported or held in position by a hollow insulator 20, 26, respectively, the axis of which forms an angle of 45° with the vertical and of 90° with the longitudinal axis of the circuit breaking chambers. Geometric insulator axis and longitudinal axis of the chamber pair lie in a common vertical plane.

The insulators 20, 26, serve as supply lines for the pressure fluid, such as air, to the four circuit breaking chambers. These insulators bear upon brackets 15, 16 of the reservoir and upon an enclosure 17 extended therefrom which contains the central valve for the admittance of the pressure fluid to the circuit breaker system and which will be described hereinafter.

The outer ends of the upper chambers 22, 28, are electrically connected with each other by means of collars 31, 32, and the elastic piece or connector 25. The terminals 11, 12 of the circuit breaker system are disposed at the lower ends of the chambers 21 and 27.

When the circuit breaker is closed, the current circulates from line terminal 11 through the conductive parts and contacts or electrodes of chambers 21, 22, collar 31, connector 25, collar 32, through chambers 28, 27 to line terminal 12.

Figure 9:
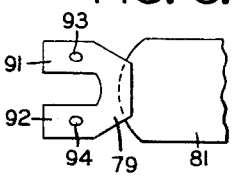
Fig. 9 is a schematic elevational section, on an enlarged scale, of a reservoir and an enclosure extended therefrom and containing the central pressure fluid admitting valve and the servicing and control device therefor.

When the circuit breakers are to be opened, the central valve 125, Fig. 9, which is housed in the enclosure 17, Figs. 1 to 3, or 82, Figs. 4 to 6, and which controls the admittance of pressure fluid to the circuit breaking chambers, will supply pressure fluid into all the four chambers. The four contact pairs, one pair in each chamber, open simultaneously.

Figure 6:
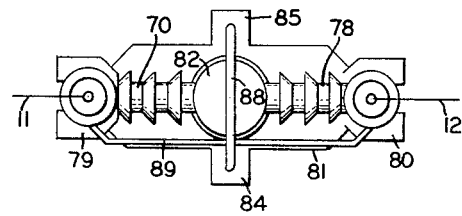
Fig. 6 is a top view of the circuit breaker-reservoir systems of Figs. 4 and 5.

The circuit breaking chambers 21, 22, 27, 28, Figs. 1 to 3, and also 71, 72, 77, 78, Figs. 4 to 6, are each shunted, as is known in the art, by resistances housed in the insulating porcelain tubes 23, 24, 29, 30, filled with an insulating liquid. The tubes are provided with expansion vessels 33 for the liquid.

The resistances are each connected electrically with one terminal to the outer ends or metallic caps 101, 102; 103, 104 or 98, 99; 105, 106 of the appertaining chambers and with the other terminal to the median metallic support 109, 110; or 111, 112 of the chamber pairs.

At the moment when the contacts are opened, the current is divided into two branches, of which one passes through the circuit breaking arc, the other through the resistance parallel thereto. The breaking of the current thus is facilitated since the resistance limits the voltage at the breaking of the current and, moreover, limits the current through the arc. The residual current through the resistance will be broken, when the section switches which cooperate with the circuit breakers will subsequently be opened. These section switches, as, for example, have been illustrated in Fig. 5 of the earlier U. S. Patent No. 2,689,888 of the André Latour and Albert Viboud, are not described here since they form no part of this invention.

The resistances, moreover, ensure a perfect distribution of the tension over the four pairs of contacts and thus a uniform breaking of the circuit in each chamber.

The elastic piece or connector 25 is secured to the two ties or rods 35, 36. These ties together with the cross tie 38 form the suspension frame which is secured to the brackets 44, 45 rigid with the reservoir 14. The frame is suspended by means of the insulator chains 40, 41 from the overhead attachment members 43 of the line tower, not shown here, since of any conventional or convenient type.

The reservoir 14 is provided at its lower part with two hollow cylindric insulators 48, 49 held together by the cross bar 50. A tensioning coupling or turn buckle 53 connects the cross bar 50 with an interconnecting chain link and a hook 54 secured at 55 to the chain element and the appropriate holding member of a convenient or conventional ground structure, here not shown in detail.

The circuit breaker-reservoir is thus held fixed between the points 43 and 55.

The hollow porcelain insulators 48, 49, Figs. 1 to 3, and 67, 68, Figs. 4 to 6, provided at the reservoir and its valve enclosure 17 or 82, contain tubes 60, 58, respectively, of insulating material the function of which will now be described with reference to Fig. 9 and Figs. 1 to 3; the arrangement for the embodiment of Figs. 4 to 6 however being the same.

Tube 60 supplies pressure fluid to the reservoir 14 and from there through a supplemental duct 115 to a servicing and control device for the central valve 125 which is to control the admittance of the pressure fluid to the hollow holding insulators 20, 26, and from there to the circuit breaking chambers 21, 22 and 27, 28, respectively.

Tube 58 supplies the command fluid, such as an incompressible liquid, oil or other, from the command post to the servicing device.

The command fluid may be set under pressure from the command post, commanded through a command or through a current transformer with relay under excessive current, or otherwise. Under the pressure of the command fluid, a piston 118 within a cylinder 119 will be displaced, to the left in the drawing. Piston 118 is connected by means of its rod 120 with a piston 121 displaceable within a cylinder 113 against the action of a spring 123. Duct 115 opens into the space of cylinder 113 and cylinder 113 into the space of the valve actuating cylinder 122.

When under the pressure of the command fluid, pistons 118 and 121 are displaced to the left, a disc 127 on rod 120 will close the passage through the opening 130 of space 122 into the enclosure 17 and thus into the atmosphere. Pressure is now admitted to the upper side of piston 124, and piston 124, against the action of a spring 126, will open valve 125 and thus admit pressure fluid over the ducts of the holding insulators 20, 26, into the four circuit breaking chambers 21, 22 and 27, 28, respectively. The circuit breakers will open, as has been described in the first mentioned U. S. Patent No. 2,584,888.

The head of conduit 58 is provided with a restricted or pressure throttling passage 128 leading into an expansion chamber 129 into which pressure fluid may thus enter but only after a certain predetermined delay. Thus, after this predetermined period of time which will depend upon the time needed for the operation of the circuit breakers, command fluid will under its pressure escape from conduit 58 through the restricted passage 128 into the expansion chamber 129 which is under atmospheric pressure, provided in the mean time the pressure has not been released from the command post. Piston 118 is released from its pressure and spring 123 will return the pistons 118, 121 into their rest position and disc 127 will open the exit 130 and thus allow exhaust of the space 122 above piston 124. The pressure of spring 126 will now prevail and the central admission valve 125 again be closed.

The same functioning of the device will occur when the pressure on the command fluid in conduit 58 is earlier released before the command fluid escapes into the expansion space 129. When, issuing from the command post, this pressure has been released, the command fluid will gradually return from the expansion chamber 129 into conduit 58.

A further advantage of the arrangement of an expansion chamber in the conduit of the incompressible command fluid is that variations of the volume of the incompressible insulating fluid, due to variations of the temperature, are made possible.

Fig. 3 illustrates a modification of the circuit breaker-reservoir system of Fig. 1 in which the system is placed upon the ground. For this purpose, the reservoir 61 with its length extension is horizontally arranged and is provided with two brackets 62, 64, by means of which it may be screwed or otherwise secured upon the supporting insulators 63, 65, respectively, mounted upon a carriage 66 or otherwise on the ground. The conduit 60 supplies, as has just been described with reference to Fig. 9, the pressure fluid to the reservoir 61 through the intermediary of the hollow insulator 67. The central valve for the admittance of pressure fluid and housed within the enclosure 17 is controlled by means of the insulated conduit 58. The elastic piece or connector 25 is secured to a metallic support or stay rod 69 rigidly joined to the enclosure 17 and thus with the reservoir 61.

The device as described has the following advantages:

Since the two chamber groups or pairs 21, 22 and 27, 28 are secured, by the intermediary of the elastic piece 25, either to the ties 35, 36, or to the support 69, the component of the weight of each chamber pair which is operative in the sense of the longitudinal axis of the chamber pair, will be taken up by the suspension frame 35, 38, 36, Figs. 1 and 2 or by the support 69, Fig. 3. The holding insulators 20, 26 thus are no longer subjected to bending strains but only to the compressive stresses corresponding to the components perpendicular to the longitudinal axis of each chamber. Their weight of construction, therefore, may be considerably reduced.

The elastic fastening member or bridge 25 at the suspension frame 35, 38, 36 or the support 69 provides for the various parts of the circuit breaker a certain elasticity and thus eliminates the risk to which otherwise the insulators might be subjected as a consequence of too great a rigidity of the circuit breaker assembly.

Moreover, the arrangement of the central valve for the admittance of the pressure fluid close to the reservoir avoids idle paths of the pressure medium and consequently all the inconveniences connected therewith and ensures a faster response of the circuit breaker to a circuit breaking command or manoeuvre.

Figs. 4 and 5 illustrate a circuit breaker-reservoir system so devised that, without any essential modification, it may be utilized as a system placed upon the ground, or as a system suspended from a tower or cantilever arm, or other carrying member.

In this circuit breaker system, the circuit breaking chambers are arranged in pairs 71, 72 and 77, 78, and symmetrically of a median, horizontal symmetry plane of the circuit breaker units such that the axis of each holding insulator 70 and 76, respectively, lying in this plane, forms an angle of 90° with the vertical, or in other terms, the axis of each chamber pair is vertical.

In accordance with a preferred embodiment of this feature of the invention, each circuit breaker unit 71, 72 and 77, 78, rests upon a bracket 79, 80, respectively, elastically secured by any conventional means, to the reservoir 81 of the pressure fluid. The insulators of the chambers 71, 72, and 77, 78, thus are subjected only to the compressive stresses whereas the holding insulators 70, 76, which admit the pressure fluid to the circuit breaker units from the reservoir 81, are subjected to much smaller stresses than otherwise in order to hold each chamber pair or column in the vertical position.

In accordance with a further characteristic of the invention, an attachment may be provided in the vicinity of the upper end of the enclosure 82 of the central valve. To this attachment, one or more insulator chains may be hooked and the circuit breaker thus be suspended from a line tower or cantilever arm or other suspension structure. In this case, the supporting insulators and the chassis or carriage may be dispensed with on which the reservoir otherwise is seated when the system is to be placed on the ground.

In order thus to dispense with the chassis 66 or carriage and the insulators 63 and 65 secured thereto, upon which the reservoir 81 for the pressure fluid is seated, two attachment tongues or brackets 84, 85 are soldered, brazed, welded, or otherwise secured to the reservoir. To these tongues there are respectively fastened two ties 86, 87 which at their upper ends are connected through a cross tie 88 or clamp. A suspension frame for the circuit breaker is thus formed by means of which the circuit breaker system may be suspended.

The arrangement of the circuit breaker units is otherwise the same as described hereinabove. Each unit comprises two circuit breaking chambers 71, 72 and 77, 78; the chambers of each pair being aligned along a vertical axis.

Any appropriate type of circuit breaking chambers may be employed such as those disclosed in my U. S. patent hereinabove referred to.

In the embodiments of Figs. 4 and 5, the two circuit breaker units 71, 72 and 77, 78, at their lower ends, are electrically connected by a bar 89 as will best be seen from the top view of Fig. 6. The current enters at 11, passes through 72, 71, 89, 77, 78, and leaves at 12. The bar 89 may be omitted, the reservoir then providing a conductive path for the current.

The supply with pressure fluid and command fluid for the operation of the circuit breaker is effected by means of the hollow porcelain insulators 67, 68 through which the insulated conduits 58 for the command fluid and 60 for the supply of the pressure fluid are passed. The porcelain insulators 67, 68 are secured at their upper ends by any conventional means, not shown here, at the reservoir and are connected at their lower ends by a bridge clamp or flange 83 secured to the chassis 66 as in Fig. 4. The bridge clamp will preferably be so devised that the reservoir may, as Fig. 5 exemplifies, be tied to the floor at 55 by means of a turn buckle 53 and hook 54 or other tensioning or tying device.

Fig. 5 illustrates the same circuit breaker-reservoir device suspended from a tower or cantilever arm or other overhead structure 90 by means of the suspension insulator chains 40, 41, secured at 43 to the overhead structure 90.

The change from a ground supported system to an overhead suspended system may easily be effected by unscrewing the supporting insulators 63, 65, respectively from the brackets 62, 64 of the reservoir 81, as well as the bridge clamp 83 from the chassis 66, and thereon suspending the circuit breaker-reservoir system, without any further change, by means of its suspension frame 86, 88, 87 from the suspending insulator chains 40, 41 attached to the tower or other overhead structure 90 and, finally, fastening the bridge clamp 83 to the chain link 56 of the anchorage hook 54. This operation may be executed easily and in a very short time.

In the system of the invention, the circuit breaker units or chamber pairs may be built up so that each unit or pair rests upon its brackets resiliently. This makes it possible, in assembling the parts, to turn the longitudinal axis of the circuit breaker units within a narrow cone or slightly tilt this axis in any direction about its vertical position as indicated by the arrows t, t' in Fig. 4, and thus to make up for the unavoidable tolerances in the manufacture of the porcelain insulators.

In this manner, the difficulties may be avoided which otherwise occur with porcelain pieces of the great dimensions which are here to be considered for circuit breakers of very high tension, for instance of the order of 300 to 380 kv. where the unavoidable tolerances make it difficult to build up such systems with great precision, or when built up to avoid inner strains of the assembled parts.

For this purpose, the brackets 79, 80 on which the circuit breaker units are seated, are elastically secured to the reservoir. The unavoidable tolerances of the various pieces are thus taken into account at the mounting and a certain movement of the group or unit which the bracket carries is made possible. Supplemental strains upon the porcelain will be avoided which might otherwise be caused by transitory stresses through exterior agents.

The brackets 79, 80 may also be rigidly and solidly joined to the reservoir and the heads or caps 98, 99 of the lower circuit breaking chambers 71 and 77 may be secured at their brackets by means of any appropriate device which makes it possible for the circuit breaker units to execute small movements.

Figures 7, 8:
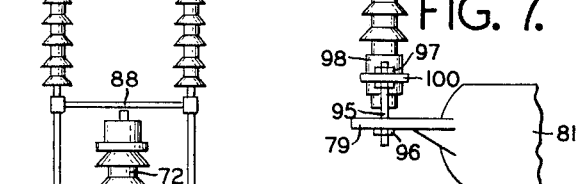
Fig. 7 is a front view of a reservoir bracket and an attachment for a circuit breaking chamber thereat.
Fig. 8 is a plan view of the bracket of Fig. 7.

Figs. 7 and 8 illustrate by way of example an arrangement which satisfies this requirement. The bracket 79 is in the shape of a fork of which each prong or finger 91, 92 is provided with an opening 93, 94, respectively, through each of which a screw threaded rod 95, is passed. The two rods, of a length sufficient to ensure the required elasticity, are secured by means of screw nuts 96, at the brackets 79, 80 and nuts 97 at collars 100 of the lower heads or caps 98, 99 of chambers 71, 77.

The chamber columns may thus be easily mounted in place relatively to the admittance duct of the pressure medium under avoidance of any adverse reaction upon the mechanical strains to which the porcelain of the insulator is subjected. The brackets make possible an easy dismounting of the chambers and, together with the arrangement of the circuit breaking chambers, a ready access to and rapid withdrawal of the contacts for their revision, particularly when the brackets are in the shape of a ring or simply of that of a fork as shown in Figs. 7 and 8. Any strains may easily be eliminated against which the porcelain might offer only relatively weak resistance.

In some particular cases, the circuit breaker-reservoir system in the embodiment to be placed upon the ground might be employed suspended at its chassis from a tower or other overhead structure. However, the suspension simply by means of the suspension frame is preferable in view of the advantages it presents over the other arrangement.

The same as the circuit breaker system with inclined arc chambers, Figs. 1 to 3, the system with vertical arc chambers, Figs. 4 and 5, presents the following advantages:

The porcelain of the insulators is practically subjected only to compressive stresses; it may thus be considerably relieved from strains; the weight and cost price of the circuit breaker may thus be reduced.

The blast valve is located in close proximity to the reservoir of the pressure medium, the length of the idle path as well as the time of response of the circuit breaker will be greatly reduced.

The elastic mounting of the chambers makes possible, easily and with simple means, to take into account unavoidable tolerances for great porcelain pieces as they are employed in the types of circuit breakers here to be considered.

The elastic mounting of the chambers furthermore eliminates accidental strains of the porcelain insulators which otherwise might occur under the action of exterior agents.

Additionally, the circuit breaker-reservoir system of the invention presents the advantages that the system may either be employed placed upon the ground or may be suspended from a tower without any necessity of changes at the system itself. The circuit breaking chambers may easily be placed in position and removed therefrom and those parts readily checked which are subject to wear.

The holding in stock of circuit breakers may be greatly simplified and reduced since the same circuit breaker may serve, in case of damage or emergency, to replace a circuit breaker to be suspended or a circuit breaker to be placed upon the ground.

I claim:

1. Sectionalizing system for high voltage transmission lines with pressure fluid operated circuit breakers and multiple circuit breaking chambers disposed symmetrically with relation to a vertical plane, including a reservoir for said pressure fluid, holding insulators associated with said circuit breaking chambers and said reservoir and secured thereto for holding said chambers at said reservoir; said holding insulators being hollow and forming ducts connected to and communicating with the spaces of said chambers and the space of said reservoir; the longitudinal axes of said holding insulators forming an angle of notable magnitude with the vertical, the longitudinal axes of said circuit breaking chambers being extended perpendicularly of said longitudinal axes of the holding insulators and lying together with same in common in vertical planes; additional supporting means being provided at said reservoir for supporting said chambers thereupon at a point remote from said holding insulators; thereby to transmit the longitudinal components of the forces of gravity from the weight of the chambers and substantially relieve the holding insulator sets from gravity moments thereon.

2. Sectionalizing system for high voltage transmission lines with a multiple of pressure fluid operated circuit breaker units of the type which comprises each a pair of circuit breaking chambers, the chambers of each pair symmetrically arranged about, and with their common longitudinal axis perpendicular to, a median symmetry axis; a holding insulator being secured to each one of said circuit breaker units and disposed coaxially with said median symmetry axis thereof, a reservoir for said pressure fluid, said holding insulator being further secured to said reservoir, each one of said holding insulators being hollow and forming a duct connected to and communicating with the space of said reservoir and with the spaces of the chambers of the appertaining circuit breaker unit; said median symmetry axis forming an angle of notable magnitude with the vertical, at least one of the chambers of each circuit breaker unit bearing upon said reservoir, thereby to transmit thereto the longitudinal component of the force of gravity from the weight of the circuit breaker unit and substantially to relieve the holding insulator appertaining thereto from the gravity moment thereon.

3. Sectionalizing system as set forth in claim 1 wherein the geometric axis of said holding insulator forms an angle of 45° with the vertical.

4. Sectionalizing system as set forth in claim 1 wherein the geometric axis of said holding insulator forms an angle of 90° with the vertical.

5. Sectionalizing system as set forth in claim 1 wherein said circuit breaking chambers are arranged in pairs, the chambers of each pair symmetrically disposed relatively to the longitudinal axis of the appertaining holding insulator.

6. Sectionalizing system as set forth in claim 2 wherein said one chamber bears with its outer end upon said reservoir and elastic means are provided between said end and the reservoir, thereby to transmit elastically the longitudinal component of the force of gravity from said circuit breaker unit to said reservoir.

7. Sectionalizing system as set forth in claim 2 wherein at least one supporting insulator is provided for supporting thereby said reservoir upon the ground.

8. Sectionalizing system as set forth in claim 2 wherein at least one insulator is provided at an overhead carrying member of a line tower for suspending said insulator therefrom.

9. Sectionalizing system as set forth in claim 8 wherein said reservoir is suspended by means of insulators between said overhead carrying member and the ground.

10. Sectionalizing system as set forth in claim 2 wherein said circuit breaker units, each with a pair of circuit breaking chambers, are disposed symmetrically about the vertical axis of said reservoir.

11. Sectionalizing system as set forth in claim 2 wherein a pair of circuit breaker units is electrically connected between the incoming line and the outgoing line of the network, each circuit breaker unit comprising a pair of circuit breaking chambers and being supported at the reservoir and between the chambers by means of a holding insulator; the circuit breaker units of each pair being connected at one of their terminals to said lines and at the other terminals together in series; the circuit breaker units, at those terminals where they are connected in series bearing upon the reservoir and being electrically connected therewith, thereby to reduce the service tension upon said reservoir and thus the electrical stresses and the dimensions of said holding insulators.

12. Sectionalizing system as set forth in claim 2 wherein at least one circuit breaker unit comprising a pair of circuit breaking chambers is provided at the end of the incoming line and at least one circuit breaker unit comprising a pair of circuit breaking chambers is provided at the end of the outgoing line; the terminals of the circuit breaker units connected to the lines being provided at the outer, free ends of one of the chambers of each circuit breaker unit, the free ends of the other chambers of each circuit breaker unit being supported upon said reservoir and the terminals at said last named ends being electrically connected to each other and to the reservoir, thereby to reduce the service tension upon said reservoir to one half and to reduce the electrical stresses and the dimensions of the holding insulators of the circuit breaker units.

13. Sectionalizing apparatus for high voltage transmission lines comprising fluid pressure operated circuit breakers and multiple circuit breaking chambers disposed symmetrically in relation to a vertical plane, a reservoir member for normally containing said pressure fluid, and hollow holding insulators connected to said chambers and to said reservoir member for maintaining said chambers in fixed spaced relationship with said reservoir member and for forming a pressure fluid transfer duct between said reservoir member and said chambers, the longitudinal axes of said insulators forming an angle of notable magnitude with said vertical plane, the longitudinal axes of said chambers being extended perpendicularly of said insulator longitudinal axes.

References Cited in the file of this patent

UNITED STATES PATENTS

| | | |
|---|---|---|
| 2,584,888 | Latour | Feb. 5, 1952 |
| 2,677,739 | Forwald | May 4, 1954 |
| 2,689,888 | Latour et al. | Sept. 25, 1954 |